United States Patent Office 2,749,370
Patented June 5, 1956

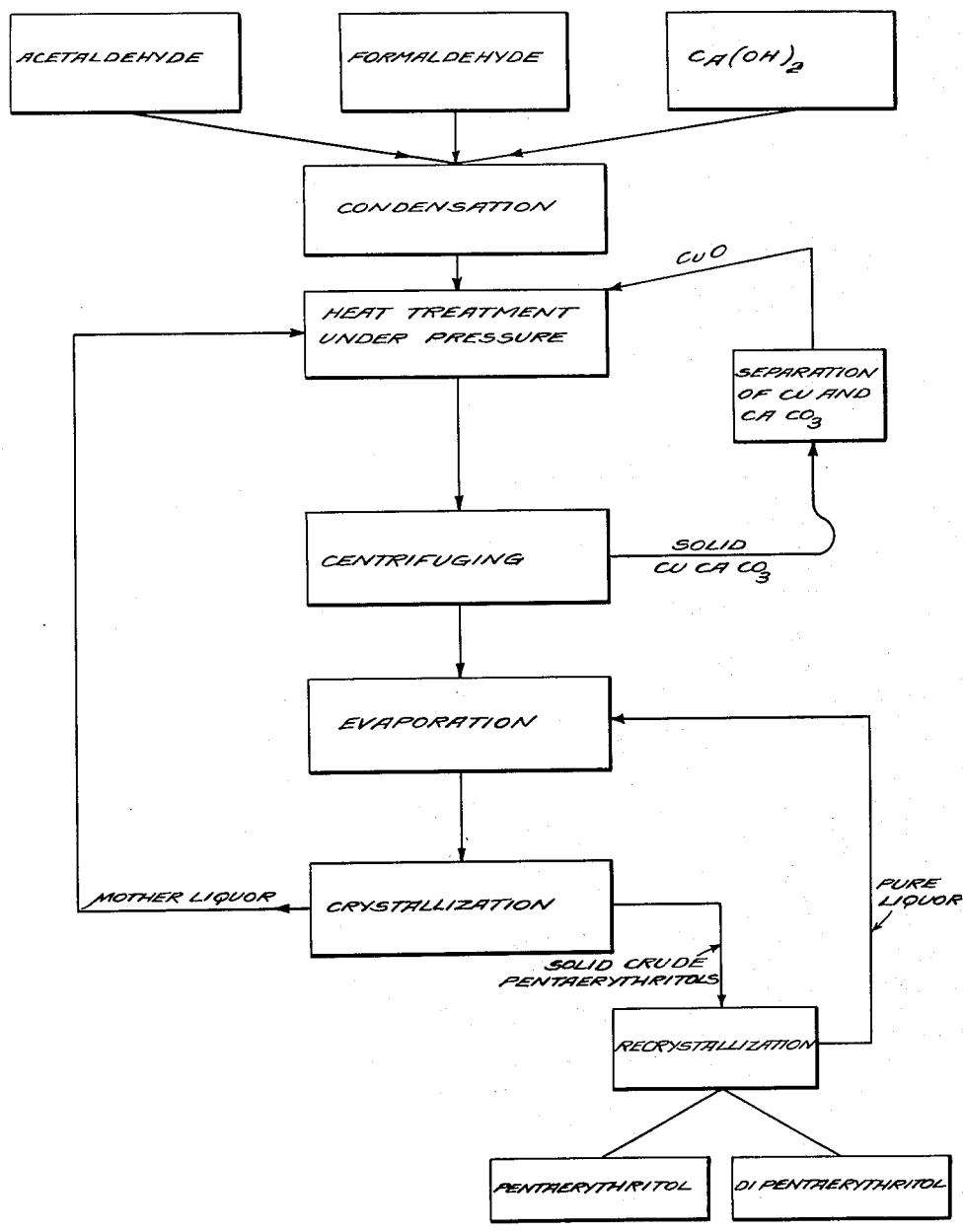

2,749,370

PROCESS FOR THE RECOVERY OF PENTAERYTHRITOLS

Heinrich Brendlein, Wolfgang, near Hanau, and Walter Pohl, Frankfurt am Main, Germany, assignors to Deutsche Gold- und Silber-Scheideanstalt vormals Roessler, Frankfurt am Main, Germany, a corporation of Germany Application February 27, 1952, Serial No. 273,736

Claims priority, application Germany February 28, 1951

13 Claims. (Cl. 260—615)

The present invention relates to an improved process for the recovery of pentaerythritols from the mixtures and solutions thereof which are normally obtained in the commercial production of pentaerythritol and dipentaerythritol.

The commercial synthesis of pentaerythritols is normally effected by an alkaline condensation of acetaldehyde and formaldehyde whereby solutions are obtained from which the recovery of the pentaerythritol and dipentaerythritol formed is tedious and difficult. The previous recovery methods usually involve repeated fractional crystallizations and at the end a mother liquor is obtained from which it is difficult to crystallize further quantities of pentaerythritol and dipentaerythritol even though considerable quantities thereof are still contained therein. This difficulty is evidently caused by the presence of the crystallization hindering syrupy by-products.

It is an object of the invention to provide a process permitting simple recovery of pentaerythritols from mixtures containing the usual syrupy by-products formed during their production from formaldehyde and acetaldehyde.

It has unexpectedly been discovered that solid pentaerythritols can be recovered from their aqueous solutions containing syrupy by-products in a simple manner when such solutions are heated under pressure at temperatures of at least 150° C. and separating the resulting solid reaction products therefrom and then recovering the pentaerythritols by the usual methods such as fractional crystallization. Good results were obtained by treatments at 200–300° C., preferably 220–260° C. in closed vessels at the pressures produced at such temperatures. The duration of the heat treatment depends upon the temperature employed and can amount to one to several hours. If acidulated mother liquors, for example, those which are acidulated with sulfuric acid, are to be treated, it is preferable to neutralize such liquor before the treatment to avoid undue corrosion of the apparatus employed. Calcium hydroxide, soda, sodium hydroxide or other bases can be employed and any resulting precipitate such as calcium sulfate can be removed either before or after the heat treatment according to the invention. If solutions of low acidity, for example, formic acid solutions, are to be treated, the neutralization can be dispensed with without any lowering of the yield of the pentaerythritols obtained.

It has been found that substantially quantitative recovery of the pentaerythritol and dipentaerythritol contained in the solutions can be achieved according to the invention. The heat treatment under pressure according to the invention is preferably carried out upon a mother liquor from which all the pentaerythritols recoverable by fractional crystallization have already been recovered. However, it is also possible to carry out such heat treatment at an earlier stage in the process, for example, right after the condensation or after any of the fractional crystallizations.

It has been found that substantially higher yields of pentaerythritol and dipentaerythritol could be obtained according to the invention, as it was previously possible by fractional crystallization. The heat treatment according to the invention can be carried out discontinuously in an autoclave, or continuously in a pressure tube, depending upon the requirements involved. When working in an autoclave the pressure ranges from 15 to 200 atmospheres, preferably from 25 to 150 atmospheres. When working continuously in a pressure tube the pressure ranges between 15 and 50 atmospheres preferably from 20 to 30 atmospheres.

Preferably the heat treated solutions are removed from the pressure apparatus at about 70 to 90° C. and the solid reaction products formed during the heat treatment under pressure are filtered off. It is, however, also possible to allow the heat treated product to cool to room temperature and then to reheat it before separating the solid product formed. The resulting solution contains substantially all of the pentaerythritol and dipentaerythritol contained in the liquor before the heat treatment under pressure and this can be recovered substantially quantitatively by concentrating the solution and cooling to effect crystallization.

It was also found that the process according to the invention possesses a further advantage in that the heat treatment under pressure converts the major portion of the formates contained in the solution to the corresponding carbonates. For example, a great portion of the calcium formate formed during the usual condensation of formaldehyde and acetaldehyde in the presence of lime will be converted to calcium carbonate during the heat treatment under pressure which decreases the quantity of the reagents normally required for removal of the calcium, as only a small fraction of the sulphuric acid or ammonium carbonate normally employed to precipitate the calcium as the sulfate or carbonate is required. If sulfuric acid is employed to remove the calcium remaining in the solution, it is necessary to filter off the calcium carbonate formed during the heat treatment before such acid treatment. If, on the other hand, ammonium carbonate is employed, it is not necessary to filter off the calcium carbonate before such treatment.

Furthermore, it has been found that the pressure treatment, especially when carried out immediately after the condensation of formaldehyde and acetaldehyde in the presence of calcium, yields a very good result when reducible compounds, preferably oxides of metals with a specific weight of at least 6.5 g./cc. are added to the solutions containing pentaerythritol. Particularly advantageous are compounds, i. e. oxides of metals which can occur in bivalent form as for instance, copper, mercury, cadmium and zinc.

It has been discovered that the conversion of formate, for instance, calcium formate to carbonate is nearly quantitative when the aforementioned reducible metal compounds are added to reactants. The total or partial conversion of formate into calcium sulfate by means of sulfuric acid can thereby be dispensed with.

The amount of the metal compound to be added depends on the reducibility of the respective compounds as well as on the quantity of formate recovered by the condensation process. Generally, the metal compounds are added in quantities equivalent to the quantity of the formate thus formed. When easily reducible metal compounds, e. g. copper oxide are employed in quantity of said metal compounds may be decreased in view to the partial conversion of formate to carbonate, besides occurring during the heat treatment under pressure. If required, the quantity of the metal compounds can also be increased. In general, quantities ranging from 50 to 150% of the amount equivalent to the amount of the formate formed proved to be adequate.

The use of reducible metal compounds with the heat treatment under pressure of the condensation solution possesses further advantages in carrying out the process of the invention because no sulfuric acid will be required for the removal of the reagents in the condensation solution. This means not only a considerable saving, but contrary to the hitherto known methods, a construction material for the apparatus can be used which must not necessarily be resistant to sulfuric acid or formic acid. The precipitation of calcium sulfate, particularly in the evaporator but also in other parts of the apparatus is practically avoided in carrying out the new invention. It was observed that the undisturbed operation and the heat economy of the new process are thereby increased.

According to the invention it has been discovered that the yield can be increased to about 80 to 90% (calculated on the acetaldehyde employed) in comparison with the yields of 60 to 70% which were obtained in the hitherto known methods. Moreover, the ash content of the raw pentaerythritol is substantially lower, i. e. 0.5 to 1%. In the previous recovery processes the raw pentaerythritol is usually contaminated with inorganic by-products and has an ash content up to 5%.

It has been found that the process according to the invention also provides the possibility to work up in a simple continuous and economic manner the condensation solution by inserting a partial cycle process as it is diagrammatically described in the drawing.

According to this cycle process the solution containing pentaerythritol formed through reacting formaldehyde and acetaldehyde in the presence of lime is subjected to a treatment under pressure at a temperature of about 220° C. whereby, for instance, copper oxide is added to the solution. Together with the calcium carbonate the copper formed is separated, for instance, by a centrifuging process or other suitable means. The solid products can be worked up as usual, either by physical methods, for instance, by a washing process, or otherwise. The copper recovered can again be employed as copper oxide in the heat treatment under pressure. The remaining liquor is then passed to the evaporator, crystallized and the raw pentaerythritols separated.

It has been discovered that the residual mother liquor mixed with fresh condensation solution may repeatedly be subjected to a heat treatment under pressure or added to the cycle process in the heat-pressure stage. In previous processes these mother liquors were hindering and unworkable by-products. The crystallized raw pentaerythritols are purified by recrystallization and recovered as pure products. The pure liquors thus formed can again be worked up in the evaporator. All the condensation solution is substantially worked up and all the pentaerythritols contained in the liquor can be recovered without a loss whereby high yields of pentaerythritols are obtained.

The following examples illustrate the manner in which the process of the invention can be carried out

EXAMPLE 1

An aqeous solution containing pentaerythritols obtained in the normal manner by condensing formaldehyde and acetaldehyde was subjected to repeated fractional crystallization until a mother liquor was obtained from which further quantities of pentaerythritol and dipentaerythritol could not be crystallized.

This mother liquor was characterized as follows:

Density _____ g./cc__  1
Formic acid content _____ per cent__ 4
Sulfuric acid content _____ do ____ 2
Pentaerythritol-dipentaerythritol content ___ do ____ 15
Ash _____ do ____ 1

One kilogram of this mother liquor was heated to 70° C. and neutralized while stirring until an alkaline reaction was obtained with a suspension of calcium hydroxide. This preheated product was then introduced into a steel autoclave of 1.8 liters capacity and heated for 2 hours therein at 250° C. during which a pressure of 150 atmospheres was obtained. After cooling, a pressure of 35 atmospheres still existed in the autoclave. After relieving the pressure the heat treated solution was removed from the autoclave and filtered after heating to 80° C. to remove the solids. The solid removed weighed 147 grams after drying. The filtrate was then subjected to fractional crystallization with stepwise concentration by evaporation. The raw pentaerythritols which were collected in the different fractions amounted to 149 grams with a melting point between 190–220° C. The ash content thereof was 0.8–1.3%. The yield of raw pentaerythritols amounted to 14.9% based upon mother liquor treated. By recrystallization a pure product was obtained consisting of pentaerythritol and dipentaerythritol having a melting point of 240° C.

Similar results were obtained when the pressure in the autoclave was held constant at 50 atmospheres by relieving the pressure during the heat treatment, cooling the autoclave contents only to 70° C. and filtering such contents at such temperature to separate the solids formed during the heat treatment before recovery of the pentaerythritols by fractional crystallization.

EXAMPLE 2

To a quantity of 1200 grams of a condensation solution (1 mol of acetaldehyde to 4.3 mol of formaldehyde) which is intended to yield 154.8 grams of pentaerythritols (based on acetaldehyde) a quantity of 52 grams of copper oxide is added (1 mol of calcium formate to 1 mol of copper oxide plus 4% excess) and the whole solution introduced into an autoclave of 2 liters capacity. The solution is heated for 30 min. at 210° C. after a heating-up period of about 1½ hours. A pressure of 65 atmospheres was obtained. After finishing the pressure treatment the solution was cooled and the precipitate filtered off. The filtrate which contained no calcium sulfate after the treatment with sulfuric acid was then evaporated and the pentaerythritols and dipentaerythritols subjected to crystallization. The raw pentaerythritols were separated from the motor liquor and weighed. To a further quantity of 1200 grams of condensation solution the mother liquor of the first treatment was added and the mixture together with a further addition of copper oxide subjected to a heat treatment under pressure. After relieving the pressure and removal of calcium and copper the filtrate was substantially free from calcium formate. The filtrate was evaporated and worked up as described, the mother liquor again added to a new charge of 1200 grams of condensation solution and so on. The whole treatment was six times repeated with 1200 grams of condensation solution and five mother liquors for the time being. The results are summarized in the following table:

Table

| Condensation solution employed | Pentaerythritol+Dipentaerythritol, grams | Percent Ash content | Mother liquor, grams | Yield, Percent |
|---|---|---|---|---|
| (a) 1,200 grs _____ | 114.6 | 0.55 | 181 | (a) 73.4 |
| (b) 1,200 grs.+mother liquor of (a) | 122.3 | 0.60 | 275 | (a+b) 76 |
| (c) 1,200 grs.+mother liquor of (b) | 135.7 | 0.84 | 241 | (a−c) 79.4 |
| (d) 1,200 grs.+mother liquor of (c) | 142.0 | 1.46 | 146 | (a−d) 81.9 |
| (e) 1,200 grs.+mother liquor of (d) | 116.4 | 0.88 | 264 | (a−e) 80.3 |
| (f) 1,200 grs.+mother liquor of (e) | 136.5 | 0.91 | 128 | (a−f) 81.4 |

Considering the contents of pentaerythritols in the last mother liquor sub (f), a total yield of 83% of pentaerythritol and dipentaerythritol was obtained, the ash content already deducted therefrom.

EXAMPLE 3

In a reaction vessel of about 12 liters capacity a mixture of 21.6 kgs. of pentaerythritol condensation solution plus 2.4 kgs. of pentaerythritol mother liquor was introduced from the bottom. The ratio of the condensation solution to the admixed mother liquor was fixed in such a manner that the same quantities of mother liquor remained after the working up and the separation of the pentaerythritols. 1.5 kgs. of cadmium oxide per hour were added simultaneously to the mixture consisting of the condensation solution and the mother liquor. The cadmium oxide was suspended in this mixture by a rapid stirrer and evenly distributed in the reaction vessel. The temperature of the reaction tube was about 220° C. A constant pressure of 35 atmospheres was obtained by regulating the waste gas. At the top of the reaction tube an overflow was mounted in order to convey the reaction mixture into a separator wherein the same pressure of 35 atmospheres existed. In order to favor an intimate mixing of the reactants, i. e. the calcium formate and the cadmium oxide a gas circulation pump was used to suck off one part of the hydrogen formed during the reaction and to introduce this hydrogen into the lower end of the reaction tube.

The solid reaction products containing calcium carbonate, cadmium carbonate and solid organic crack products were separated in the conically tapering separator and continually removed with a slider. The substantially clear reaction solution was sucked off by a relief valve at the upper part of the separator. The flowing off liquids of both centrifuges are collected, evaporated and the resulting pentaerythritols and dipentaerythritols crystallized. 2.4 kgs. of a pentaerythritol-dipentaerythritol mixture were recovered per hour. The yield of this mixture amounted to 86.5%, based on acetaldehyde.

We claim:

1. In a process for the recovery of pentaerythritols from an aqueous solution obtained in the condensation of formaldehyde and acetaldehyde containing pentaerythritols and the syrupy products obtained in such condensation the steps which comprise seating such aqueous solution to a temperature between 150° C. and 300° C. under a pressure from 15 to 200 atmospheres, separating the solid reaction products formed during the heat treatment under pressure and then recovering pentaerythritols from such solution.

2. A process according to claim 1 in which said process is carried out continuously.

3. In a process for the recovery of pentaerythritols from an aqueous solution obtained in the condensation of formaldehyde and acetaldehyde containing pentaerythritols and the syrupy products obtained in such condensation involving fractional crystallization of such solution to recover solid pentaerythritol and depentaerythritol the steps which comprise heating such aqueous solution at a point in the process after said condensation at a temperature between 150° C. and 300° C. under a pressure from 15 to 200 atmospheres to form solid reaction products, separating such solid reaction products from the solution and then recovering solid pentaerythritol and dipentaerythritol from such solution by fractional crystallization.

4. A process according to claim 3, in which said heat treatment is carried out at temperatures between 220° C. and 260° C.

5. A process according to claim 3, in which said solution is neutralized before the heat treatment.

6. A process according to claim 3, in which such heat treatment is carried out upon the solution before it has been subjected to fractional crystallization.

7. A process according to claim 3, in which the pressure ranges from 25 to 150 atmospheres.

8. In a process for the recovery of pentaerythritols from an aqueous solution obtained in the condensation of formaldehyde and acetaldehyde in the presence of lime, containing pentaerythritols, the syrupy products and calcium formate obtained in such condensation the steps which comprise adding to such aqueous solution at least one reducible compound of a heavy metal having a specific weight of at least 6.5 g./cc., said metal also occurring in bi-valent form, the quantity of said reducible compound added being 50% to 150% of the amount equivalent to the calcium formate in such solution, heating such aqueous solution to a temperature between 150° C. and 300° C. under a pressure of from 15 to 200 atmospheres, separating the solid reaction products formed during the heat treatment and then recovering pentaerythritols from such solution.

9. In a process for the recovery of pentaerythritols from an aqueous solution obtained in the condensation of formaldehyde and acetaldehyde in the presence of lime, containing pentaerythritols, the syrupy products and calcium formate obtained in such condensation the steps which comprise adding to such aqueous solution at least one reducible oxide selected from the group consisting of copper, mercury, cadium and zinc oxides, the quantity of said reducible oxide added being 50% to 150% of the amount equivalent to the calcium formate in such solution, heating such aqueous solution to a temperature between 150° C. and 300° C. under a pressure of from 15 to 200 atmospheres, separating the solid reaction products formed during the heat treatment and then recovering pentaerythritols from such solution.

10. A process according to claim 9, in which the reduced metal compound is reoxidized and again inserted into the process at the stage of the heat-pressure treatment.

11. In a process for the recovery of pentaerythritols from an aqueous solution obtained in the condensation of formaldehyde and acetaldehyde in the presence of lime, containing pentaerythritols, the syrupy products and calcium formate obtained in such condensation the steps which comprise adding to such aqueous solution at least one reducible oxide selected from the group consisting of copper, mercury, cadium and zinc oxides, the quantity of said reducible oxide added being 50% to 150% of the amount equivalent to the calcium formate in such solution, heating said aqueous solution to a temperature between 150° C. and 300° C. under a pressure of from 15 to 200 atmospheres, separating the solid reaction products formed during the heat treatment, recovering pentaerythritols from such solution and working up the remaining mother liquors.

12. A process according to claim 11, in which the mother liquors separated from the pentaerythritols are mixed with a fresh condensation solution, said mixture again subjected to the heat-pressure treatment.

13. A process according to claim 11, in which the mother liquors separated from the pentaerythritols are recycled into the process at the stage of the heat-pressure treatment.

References Cited in the file of this patent
UNITED STATES PATENTS

| | | |
|---|---|---|
| 2,206,379 | Wyler | July 2, 1940 |
| 2,251,236 | Wyler et al. | July 29, 1941 |
| 2,288,929 | Wyler | July 7, 1942 |
| 2,329,514 | Cox | Sept. 14, 1943 |
| 2,562,102 | Jackson et al. | July 24, 1951 |
| 2,651,662 | Russell | Sept. 8, 1953 |